United States Patent
Hong

[11] Patent Number: 5,909,339
[45] Date of Patent: Jun. 1, 1999

[54] METHOD AND APPARATUS FOR CLEANING AIR IN A HARD DISK DRIVE

[75] Inventor: Weon Ki Hong, Kyunggi-do, Rep. of Korea

[73] Assignee: Samsung Electro-Mechanics Co., Ltd., Kyunggi-do, Rep. of Korea

[21] Appl. No.: 08/900,520

[22] Filed: Jul. 25, 1997

[30] Foreign Application Priority Data

Aug. 20, 1996 [KR] Rep. of Korea ............ 96-34330

[51] Int. Cl.[6] .................... G11B 17/02; H02K 7/08
[52] U.S. Cl. .................... 360/98.07; 384/115; 310/90; 360/97.03
[58] Field of Search ............ 360/97.01–98.01, 360/98.07, 98.08, 99.04, 99.08, 99.12; 384/111–113, 114, 115; 310/58, 61, 60 A

[56] References Cited

U.S. PATENT DOCUMENTS

| | | | |
|---|---|---|---|
| 4,282,554 | 8/1981 | Ho et al. | 360/97.02 |
| 4,385,333 | 5/1983 | Hasler | 360/97.03 |
| 4,656,545 | 4/1987 | Kakuta | 360/97.03 |
| 5,018,881 | 5/1991 | Asada | 384/113 |
| 5,179,483 | 1/1993 | Lowe | 360/97.02 |
| 5,221,179 | 6/1993 | Ikegami et al. | 415/55.1 |
| 5,427,456 | 6/1995 | Hensel | 384/112 |
| 5,430,590 | 7/1995 | Ainslie et al. | 360/98.07 |
| 5,453,890 | 9/1995 | Takegami et al. | 360/97.02 |
| 5,491,596 | 2/1996 | Kobori | 360/97.03 |
| 5,559,382 | 9/1996 | Oku et al. | 310/90 |
| 5,559,651 | 9/1996 | Grantz et al. | 360/99.08 |
| 5,659,445 | 8/1997 | Yoshida et al. | 360/98.07 |
| 5,710,678 | 1/1998 | Leuthold et al. | 360/99.08 |
| 5,715,116 | 2/1998 | Moritan et al. | 360/99.08 |
| 5,751,084 | 5/1998 | Park | 310/90 |
| 5,760,509 | 6/1998 | Chung | 310/90 |
| 5,822,846 | 10/1998 | Moritan et al. | 29/598 |

*Primary Examiner*—Jefferson Evans
*Attorney, Agent, or Firm*—Lowe Hauptman Gopstein Gilman & Berner

[57] ABSTRACT

The present invention relates to a method and apparatus for cleaning air in a hard disk drive by gathering the air in the upper and lower portion of the disk and discharging it outwardly through the air discharging position in order to maintain an optimum condition of the air space and reduce the error rate of the hard disk drive. There is provided an air cleaning apparatus for use in a hard disk drive including a spindle motor having a stator, rotor and rotating shaft, a plurality of disks mounted on a circumference of the rotor of the spindle motor, in which the air cleaning apparatus includes an upper air guiding mechanism, provided on an upper side of the rotor, for gathering air to a center of the rotor when the rotor rotates, a lower air guiding mechanism, provided on a lower side of the rotor, for gathering air to a center of the rotor when the rotor rotates, and an air discharging portion extending from the periphery of the rotating shaft to a lower exterior for the rotating shaft, so as to discharge the gathered air to the lower side of the rotating shaft.

28 Claims, 7 Drawing Sheets

5,909,339

METHOD AND APPARATUS FOR CLEANING AIR IN A HARD DISK DRIVE

BACKGROUND OF THE INVENTION

1. Field of the Invention

The present invention relates generally to a hard disk drive, and more particularly to a method and apparatus for cleaning air in the hard disk drive, in which the air in the periphery of the disk can be gathered to the center of the rotor and then discharged below.

2. Description of the Prior Art

In general, a spindle motor used in a hard disk drive or a magnetic recording and reading apparatus, as will be seen in FIG. 1, includes a number of disks a2, a spacer a3 interposed between the disks, and a clamp a4 for locking the uppermost portion of the disks and the upper surface of the rotor a1, as will be shown in FIG. 3, in which the upper and lower ends of the rotating shaft a5 are journalled to a housing a6 by bearings a7.

Because the above disks operate in very close proximity with a head, for example with a gap of about 0.2 µm, they should prevent the dust from coming in. Accordingly, the periphery of the disks is called a cleaning area in which clean air should be maintained.

For example, an outer casing a8 is provided with an air filter a9 to remove dust or fine powdery substances contained in the air and to take in only clean air. The upper motor bearing is provided with a seal apparatus such as a labyrinth seal a10 or a magnetic fluid seal to prevent bearing grease or the like from scattering toward the disks.

In another prior art structure as shown in FIG. 2 the disk clamp b1 has only a clamping function. With the structure having an air filter b3 provided to casing b2, air swirls caused by the rotating disk b4 disperses the air radially and outwardly by centrifugal force such that the dust in the air tends to leak out toward the disk b4.

In addition, if the seal apparatus, i.e., seal a10, rotates faster than a predetermined spinning speed or is used for a long time, the liquid magnet may be scattered. In addition, the seal is very expensive, and due to a number of components that require assembly it is difficult to manufacture, thereby curtailing the productivity.

SUMMARY OF THE INVENTION

It is a main object of the present invention to solve the problems involved in the prior art, and to provide a hard disk drive capable of gathering the air in the upper and lower portion of the disk and then discharging it outwardly through the air discharging portion, in order to maintain an optimum condition of the air space, and further, reduce the error rate of the hard disk drive and prolong the life thereof.

In order to achieve the above objects, there is provided a method for cleaning air in an air cleaning apparatus for use in a hard disk drive including a spindle motor having a stator, rotor and rotating shaft, a plurality of disks mounted on a circumference of the rotor of the spindle motor, by means of the rotatable rotor of the spindle motor, upper and lower air guiding mechanisms, respectively, provided on upper and lower sides of the rotor, air around the rotor being gathered to a center of the rotor when the rotor rotates, and then discharged outwardly through an air discharging portion, thereby continuously cleaning the space around the disks. To execute the above method, there is provided an air cleaning apparatus for use in a hard disk drive including a spindle motor having a stator, rotor and rotating shaft, a plurality of disks mounted on a circumference of the rotor of the spindle motor, the air cleaning apparatus comprising: an upper air guiding mechanism, provided on an upper side of the rotor, for gathering air to a center of the rotor when the rotor rotates, a lower air guiding mechanism, provided on a lower side of the rotor, for gathering air to a center of the rotor when the rotor rotates, and an air discharging portion extending from the peripheral of the rotating shaft to an exterior, so that the air around the disks is gathered to the center and then discharged from the lower portion.

BRIEF DESCRIPTION OF THE DRAWINGS

The above objects, other aspects, and advantages of the invention will become apparent by describing the preferred embodiments thereof with reference to the accompanying drawings, in which.

DETAILED DESCRIPTION OF THE PREFERRED EMBODIMENTS

First Embodiment

Figure 1:
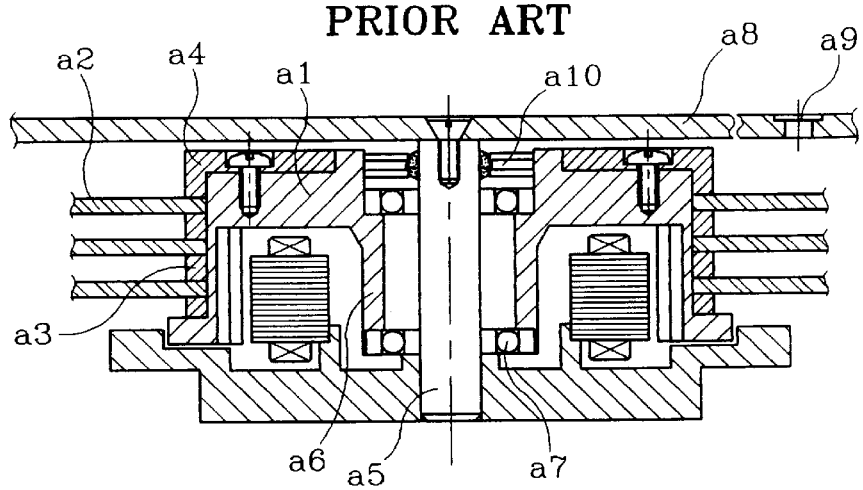
FIG. 1 is a cross-sectional view illustrating the structure of a prior art hard disk drive.
Figure 2:
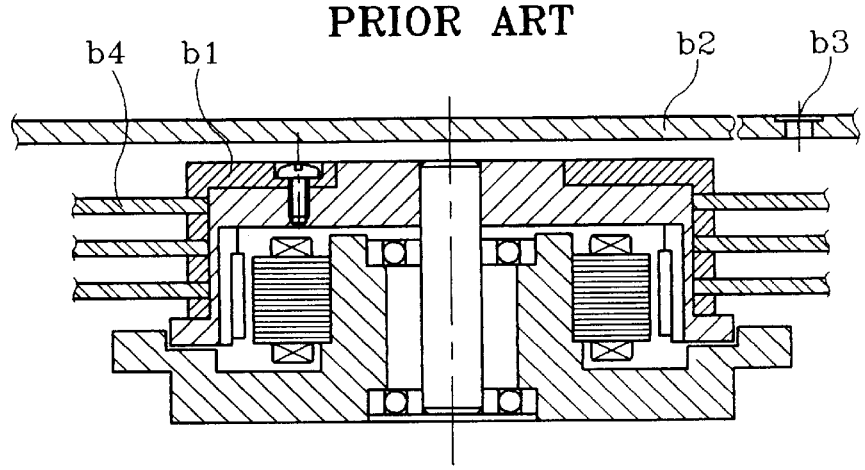
FIG. 2 is a cross-sectional view illustrating the structure of another prior art hard disk drive.
Figure 3:
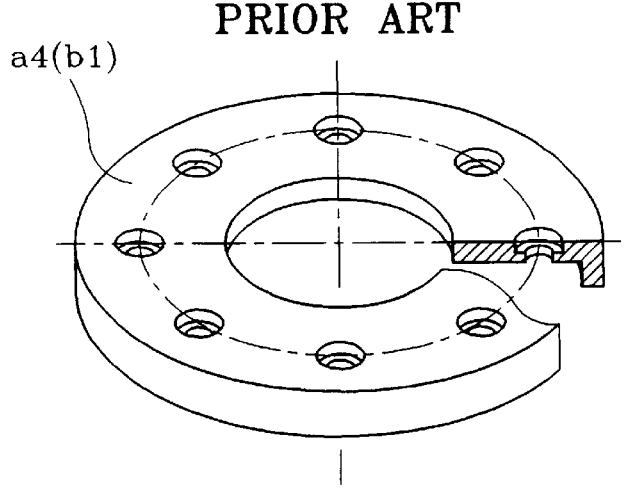
FIG. 3 is a partially cutaway view of the disk clamp of FIGS. 1 and 2.
Figure 4A:
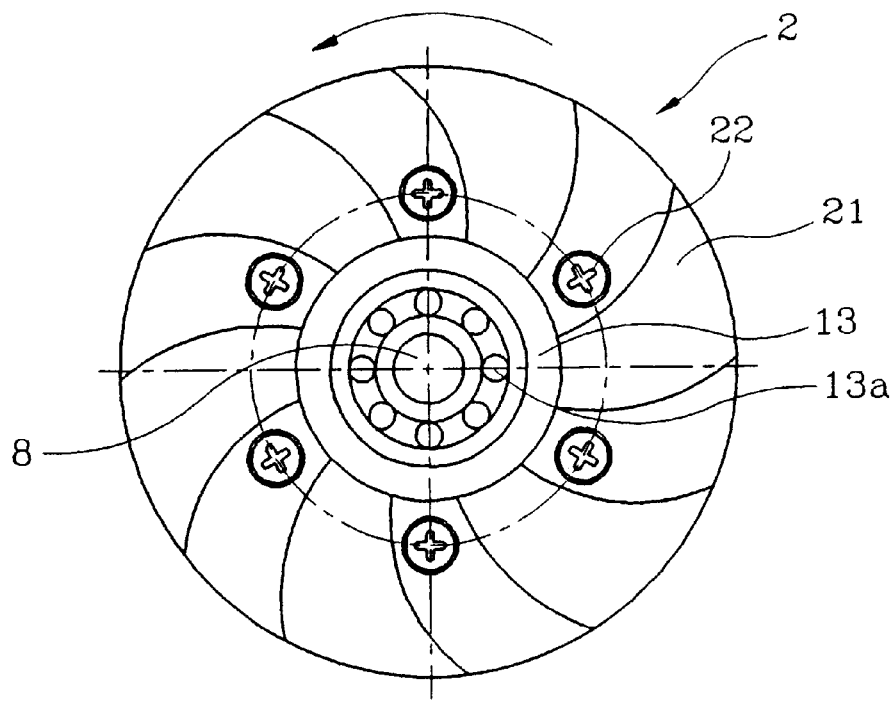
FIGS. 4A and 4B are top plan and cross-sectional views, respectively, illustrating the structure and operation of the hard disk drive according to the present invention.
Figure 4B:
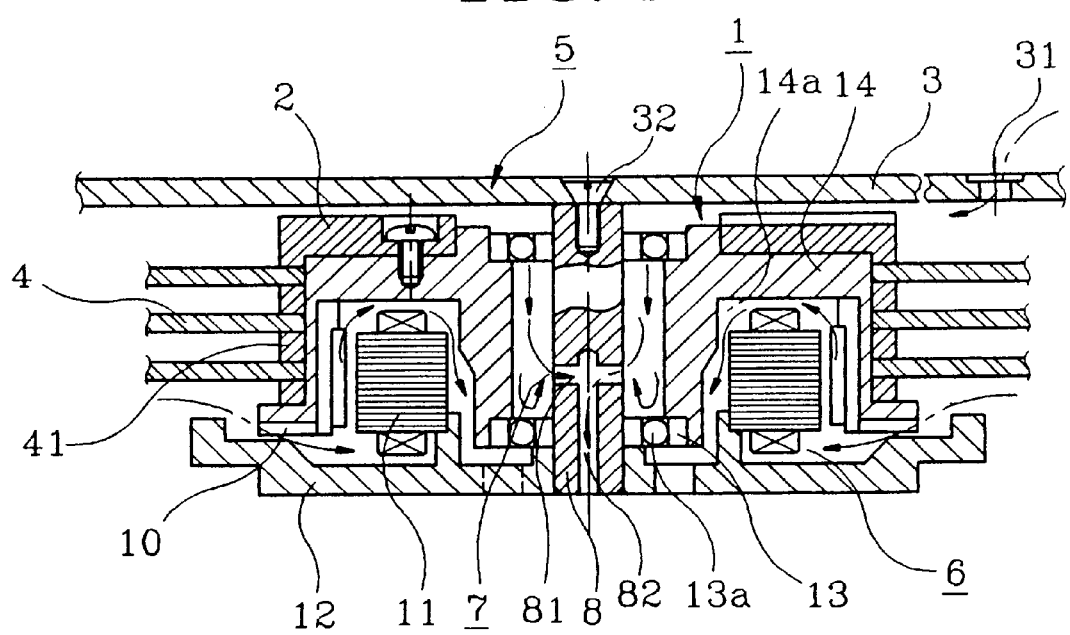

FIGS. 4A and 4B illustrate the typical structure and operation of the air cleaning mechanism according to a first embodiment of the present invention, in which the shaft of the motor is fixed and not rotatable.

In the motor of the first embodiment a stator 11 is fixed to the bottom of a base member 12 and a shaft 8 is fitted to the base member 12 at the center of the stator 11. The rotor 1 is journalled, in which the upper and lower ends of the non-rotating shaft 8 pass through bearings 13. Accordingly, the shaft 8 is not rotatable and is fixed to an upper casing 3 by a screw 32. A number of disks 4 which are constantly spaced by spacers 41 therebetween are mounted around the outer circumference of the rotor 1, and the uppermost portion of the disks and the upper surface of the rotor 1 are locked by a disk clamp 2.

In the motor arrangement as described above, an upper air guiding mechanism 5 is provided to the upper surface of the disk clamp 2, and also a lower air guiding mechanism 6 is provided to the lower end of the rotor 1. The periphery of the shaft 8 is provided with an air discharging portion 7.

Figure 5:
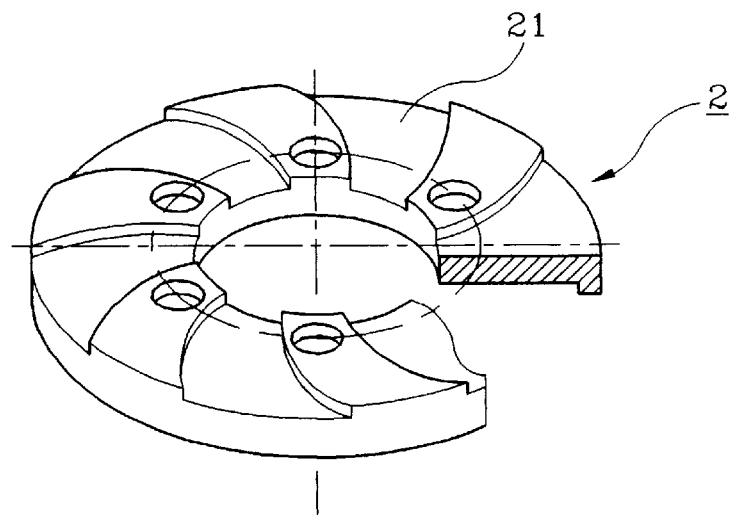
FIG. 5 is a partially cutaway view of the disk clamp of the present invention.

The upper air guiding mechanism 5, as will be seen in FIG. 5, is provided on the upper surface of the disk clamp 2 with a number of spiral-shaped recesses 21 so that when the rotor 1 rotates the air present near the upper part of the rotor can be gathered toward the center thereof.

Figure 6:
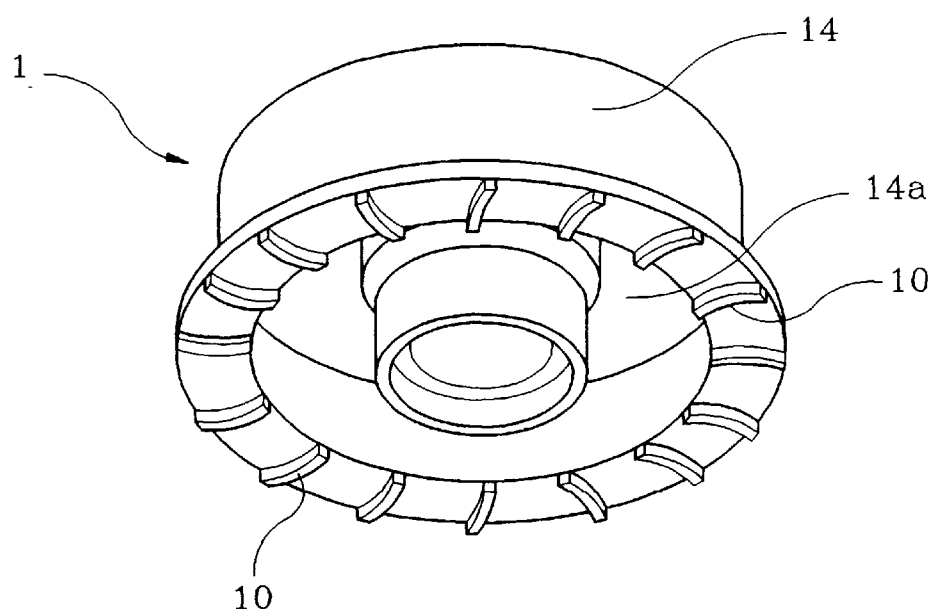
FIG. 6 is a perspective bottom view of the rotor of the present invention.

Meanwhile, the lower air guiding mechanism 6, as will be seen in FIG. 6, is provided on the bottom surface of the rotor 1 with a number of spiral-shaped bosses 10 which are oriented to the center of the rotor so that when the rotor rotates the air in the lower of the rotor can be gathered toward the center thereof.

As shown in FIGS. 4B, the air discharging portion is provided with an inlet port 81 extending through the inner space of a housing 14 and shaft 8 and an outlet port 82 extending from the inlet port through the axis of the shaft to the lower end thereof.

In FIGS. 4A and 4B reference numeral 22 indicates a screw for locking the disk clamp 2 and 31 indicates an air filter formed on one side of the casing.

The hard disk drive according to the first preferred embodiment operates in such a way that when the rotor rotates, the peripheral air is gathered towards the center thereof by the upper and lower air guiding mechanisms, respectively, provided on the upper and lower parts of the spindle motor, and is then discharged outwardly through the air discharging portion formed on the periphery of the shaft 8, thereby continuously maintaining clean air around the disks.

More particularly, most of the air enters the periphery of the hard disk drive through the air filter 31 provided on the side of the casing 3.

While the air inlet as described above do not normally flow, at the beginning of the operation of the hard disk drive, the rotor 1 of the spindle motor rotates and the air near the upper part thereof is gathered to the center by the recesses 21 of the upper air guiding mechanism 5. The gathered air flows to the inside of the housing 14 through the balls 13a of the upper bearing 13 journalled to the upper end of the shaft 8. And also, the air near the lower portion thereof is gathered to the center by the bosses 10 of the lower air guiding mechanism 6, and flows to the inside of the housing 14 through balls 13a of the lower bearing 13 journalled to the lower end of the shaft 8. Thus, gathered air in the inside of the housing is wholly discharged to the outside of the hard disk drive through the air discharging portion 7.

If the air circulation as described above occurs, the new air is inlet through the air filter 31, and the air in the inside which contains dust is gathered to the center thereof and is discharged, so that it could be guaranteed that the clean air exists inside the hard disk drive.

Describing the operation more clearly, because the upper surface of the disk clamp 2 has spiral-shaped recesses 21, as soon as the rotor 1 rotates in the counter clock-wise direction as shown in FIG. 4A, the air is guided inwardly and gathered to the center by the recesses 21.

Also, because the bottom surface of the rotor 1 has spiral-shaped bosses 10, when the rotor 1 rotates, the air is guided in the inner direction of the rotor 1.

The air gathered inside the housing 14 then flows through the inlet port 81, passes horizontally through the shaft 8 and is discharged from the outlet port 82 passing vertically through and along the shaft.

Second Embodiment

Figure 7A:
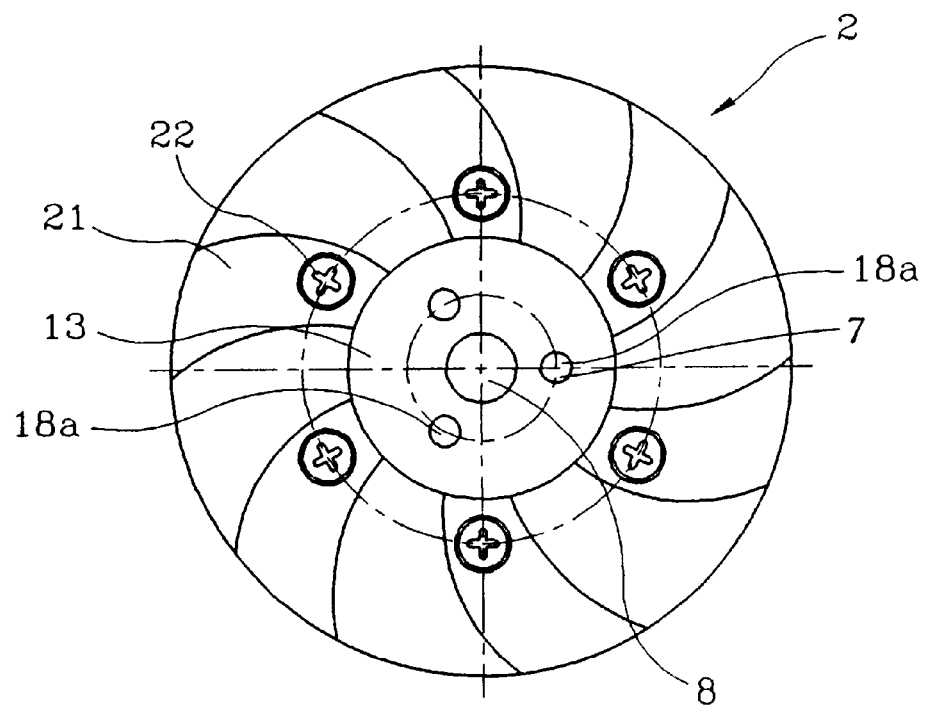
FIGS. 7A and 7B are top plan and cross-sectional views, respectively, illustrating another structure and operation of the hard disk drive according to the present invention.
Figure 7B:
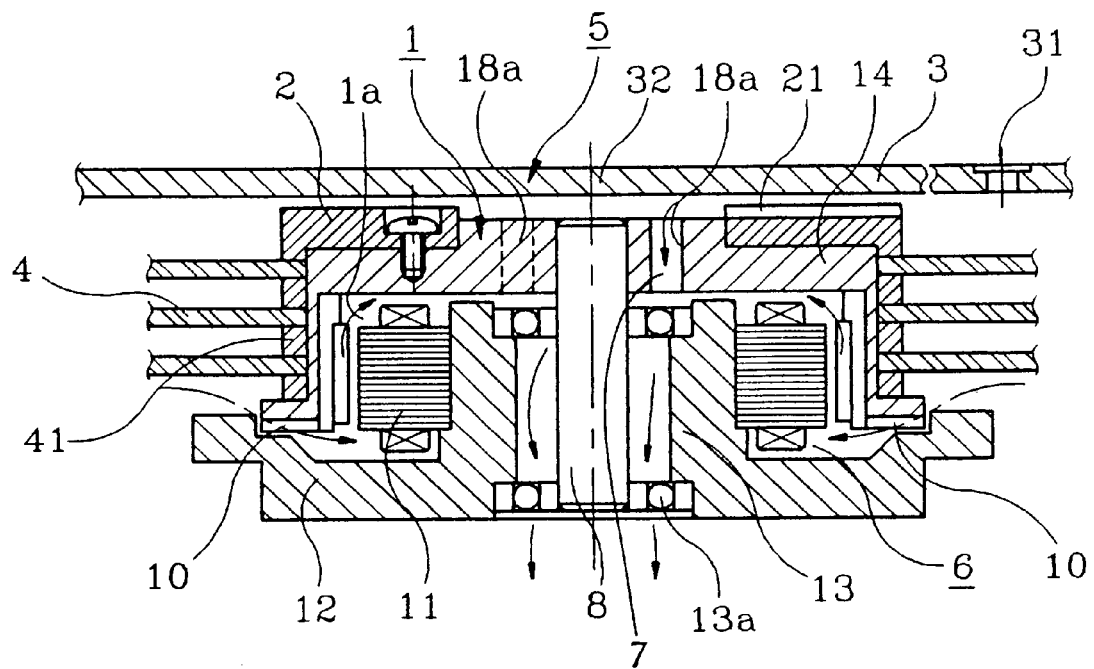

FIGS. 7A and 7B illustrate the structure and operation of the air cleaning mechanism according to a second embodiment of the present invention, in which the shaft of the motor is not fixed and rotates together with the rotor.

In the motor of the second embodiment, the stator 11 is fixed to the bottom of a base member and the base member 12 is fitted cylindrically to the center of the stator 11 to form the housing 14. On the inner diameter portion of the housing 14 the upper and lower bearings 13a are disposed around the periphery of the rotating shaft 8. The rotor 1 is journalled to the upper end of the rotating shaft 8. The outer diameter portion of the rotor is locked to the disks 4 by means of the disk clamp 2.

In the motor arrangement as described above, an upper air guiding mechanism 5 is provided to the upper surface of the disk clamp 2, and also a lower air guiding mechanism 6 is provided to the lower end of the rotor 1. The periphery of the rotating shaft 8 is provided with an air discharging portion 7.

The upper air guiding mechanism 5 is provided on the upper surface of the disk clamp 2 with a number of spiral-shaped recesses 21 so that when the rotor 1 rotates the air present in the upper part of the rotor can be gathered towards the center thereof, similar to the first embodiment. Also, the lower air guiding mechanism 6, as will be seen in FIG. 6, is provided on the bottom surface of the rotor 1 with a number of spiral-shaped bosses 10 which are oriented to the center of the rotor so that when the rotor rotates, the air near the lower portion of the rotor can be gathered towards the center thereof, similar to the first embodiment, except that the air discharging portion 7, as will be seen in FIG. 7A, includes 3 to 7 vertical through holes 18a formed around the rotating shaft 8 on the upper surface of the rotor 1 and an inner space 1a provided between the inner portion of the rotor 1 and the housing 14.

The hard disk drive according to the second preferred embodiment operates in such a way that when the rotor rotates, the peripheral air is gathered towards the center thereof by the upper and lower air guiding mechanisms, respectively, provided on the upper and lower ports of the spindle motor, and is then discharged outwardly through the air discharging portion formed on the periphery of the rotating shaft, thereby continuously maintaining the clean air space around the disk.

More particularly, at the beginning of the operation of the hard disk drive, because the rotor 1 of the spindle motor rotates, the air near the upper part thereof is gathered to the center by the recesses 21 of the upper air guiding mechanism 5. The gathered air blows to the inside of the housing 14 through the number of vertical through holes 18a formed around the rotating shaft 8 at the rotor 1 and the balls 13a of the upper bearing 13 journalled to the upper end of the rotating shaft 8. Also, the air in the lower portion is gathered to the center by the bosses 10 of the lower air guiding mechanism 6, and blows to the inside of the housing 14 through balls 13a of the lower bearing 13 journalled to the lower end of the rotating shaft 8.

If the circulation of air as described above occurs, the new air is inlet through the air filter 31, and the air in the inside which contains dust is gathered to the center thereof and discharged to ensure that clean air exists in the inside of the hard disk drive.

Meanwhile, in the first and second embodiments, it is necessary maintain the atmosphere difference between each portion in order to obtain good circulation of air in the cleaning space.

Figure 12:
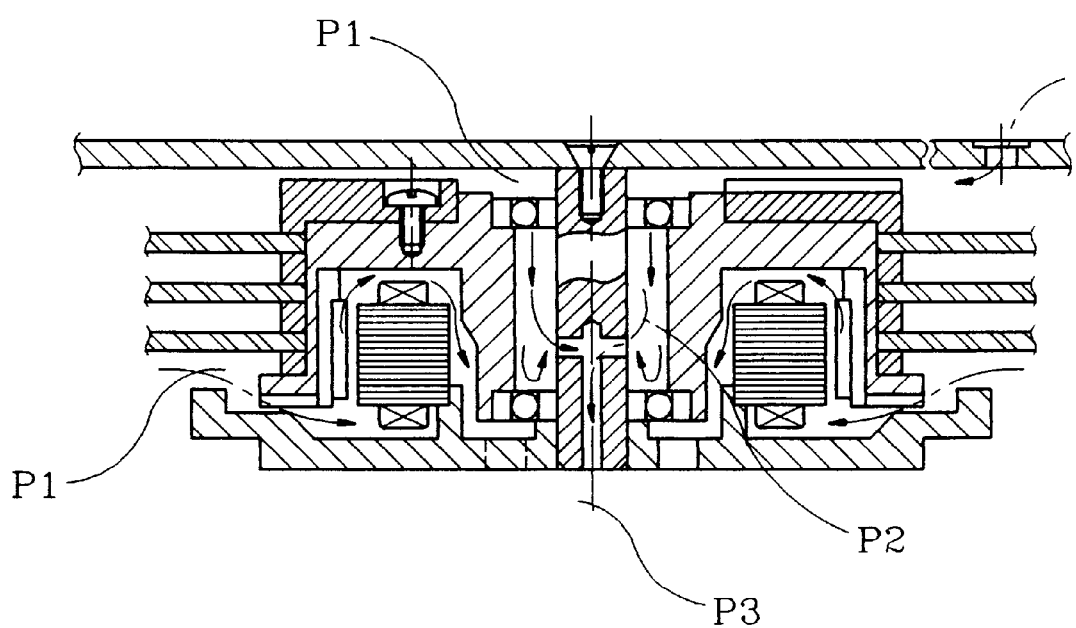
FIG. 12 is a view illustrating the operation of the present invention.

As will be seen in FIG. 12, in order to smoothly discharge the air gathered by the air guiding apparatus through the air discharging portion, on the assumption that the atmosphere in the upper center of the rotor formed by the air guiding mechanism is P1, the atmosphere in the inner diameter portion of the housing at the air discharging portion is P2, and the atmosphere in outer side of the air discharging portion is P3, which satisfies the relation of P1>P2>P3, the air can flow from the upper center to the inner diameter portion of the housing and from the inner diameter portion of the housing to outside of the disk drive.

Alternatively, the upper air guiding apparatus 5 of the above first and second embodiments may be modified as described below.

Figure 8:
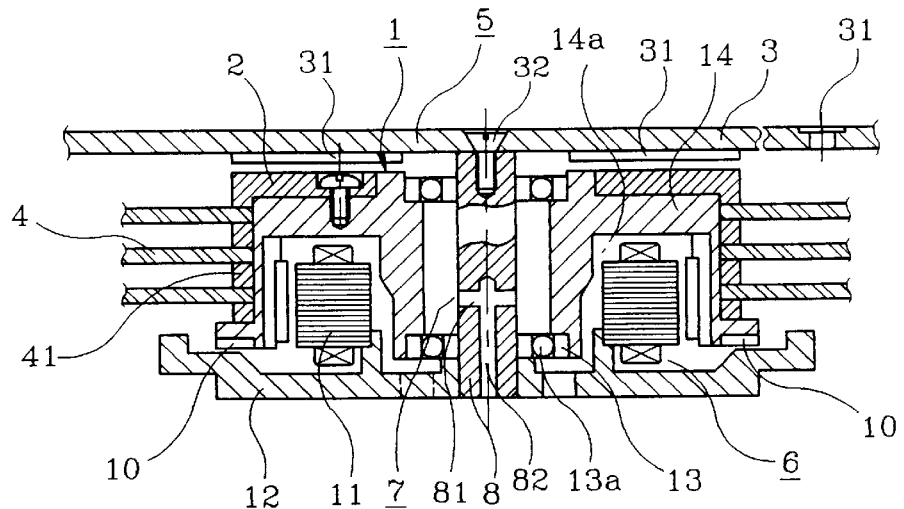
FIG. 8 is a cross-sectional view illustrating still another structure and operation of the hard disk drive according to the present invention.
Figure 9:
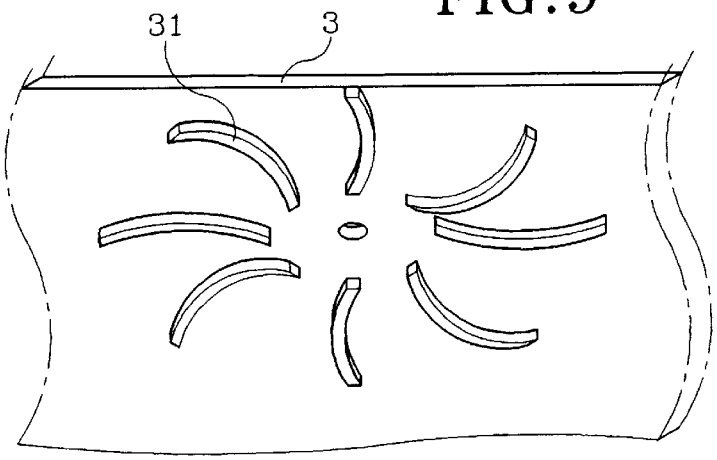
FIG. 9 is a perspective view of an air guiding mechanism in FIG. 8.

FIGS. 8 and 9 illustrate an impeller 31 formed on the bottom surface of the upper casing 3, in which when the rotor rotates, the air can be gathered to the center by the grooves of the fixed impeller 31.

Figure 10:
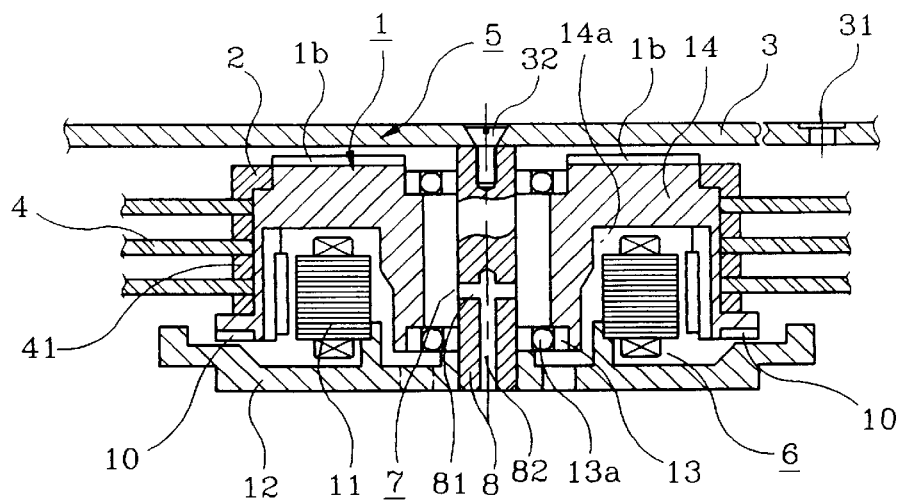
FIG. 10 is a cross-sectional view illustrating further another structure and operation of the hard disk drive according to the present invention.

Also, FIG. 10 illustrates another hard disk drive, in which the disk clamp 2 has a shorter length and the upper surface of the rotor 1 is directly formed with the spiral-shaped recesses 1b, and is not formed on the upper surface of the clamp.

Figure 11A:
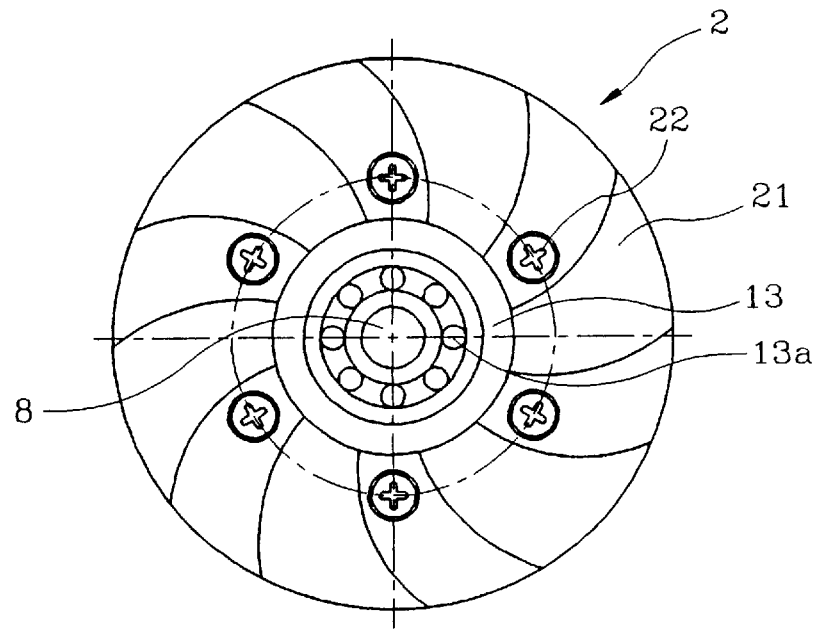
FIGS. 11A and 11B are top plan and cross-sectional views, respectively, illustrating other structure and operation of the hard disk drive according to the present invention.
Figure 11B:
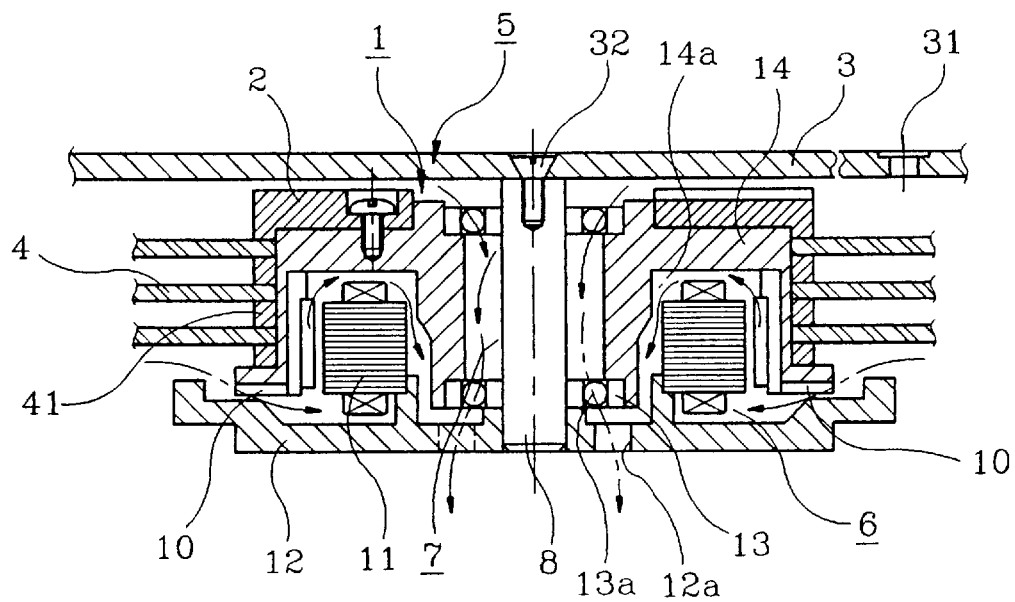

The air discharging portion 7 illustrated in the first and second embodiments can be modified as follows:

As will be seen in FIGs 11A and 11B, an air outlet port 12a is formed, not on the inside of the rotating shaft 8, but on the inner bottom of the housing to which the stator 11 is fixed, to discharge the air outwardly.

As described in detail above, in the hard disk drive according to the present invention, because the upper surface of the rotor of the motor is provided with the upper air guiding mechanism, the lower surface of the rotor is provided with the lower air guiding mechanism and the center is provided with the air discharging portion, when the motor operates, they will gather the air in the upper and lower portions towards the center thereof and discharge them outwardly through the air discharging portion.

Therefore, because grease or other substances are prevented from scattering towards the hard disk, the arrangement according to the present invention has the advantages of maintaining the condition of clean air space in most suitable, reducing the error rate of the hard disk drive and prolonging the life of the hard disk drive.

While the present invention has been described and illustrated herein with reference to the preferred embodiments thereof, it will be understood by those skilled in the art that various changes in form and details may be made therein without departing from the spirit and scope of the invention.

What is claimed is:

1. An air cleaning apparatus for use in a hard disk drive including a spindle motor having a stator, a rotor and a rotating shaft, a plurality of disks adapted to be mounted on a circumference of the rotor of the spindle motor, the air cleaning apparatus comprising:

an upper air guiding mechanism, provided on an upper side of the rotor, for gathering air to a center of the rotor when the rotor rotates; and an air discharging portion extending from the periphery of the rotating shaft to a lower exterior end of the shaft, so as to discharge the gathered air to the lower exterior end of the shaft.

2. The air cleaning apparatus as claimed in claim 1, wherein the upper air guiding mechanism includes an impeller, provided between the rotor and an upper casing positioned above the rotor, in coaxial relation with the rotating shaft, for guiding the air towards the center upon rotation of the rotor.

3. The air cleaning apparatus as claimed in claim 2, wherein the impeller of the upper air guiding mechanism is fixed to a lower surface of the upper casing of the rotor in coaxial relation with the rotating shaft.

4. The air cleaning apparatus as claimed in claim 1, wherein the upper air guiding mechanism includes spiral-shaped recesses formed on an upper surface of the rotor.

5. The air cleaning apparatus as claimed in claim 1, wherein the upper air guiding mechanism includes spiral-shaped recesses formed on an upper surface of a disk clamp which engages with the disks on the upper side of the rotor.

6. The air cleaning apparatus as claimed in claim 1, wherein the air discharging portion includes an inner diameter portion, placed between upper and lower bearings, for supporting the rotating shaft, and an outlet port operable to downwardly pass the gathered air through the rotating shaft.

7. The air cleaning apparatus as claimed in claim 1, wherein the air discharging portion includes an inner diameter portion, placed between upper and lower bearings, for supporting the rotating shaft, and a plurality of through ports extending vertically from an upper center of the rotor.

8. The air cleaning apparatus as claimed in claim 1, wherein the air discharging portion includes an inner diameter portion, placed between upper and lower bearings for supporting the rotating shaft, and an outlet portion perforation on a bottom of a housing to which the stator is fixed.

9. An air cleaning apparatus for use in a hard disk drive including a spindle motor having a stator, a rotor and a rotating shaft, a plurality of disks adapted to be mounted on a circumference of the rotor, the air cleaning apparatus comprising:

a lower air guiding mechanism, provided on a lower side of the rotor, for gathering air to a center of the rotor when the rotor rotates; and an air discharging portion extending from the periphery of the rotating shaft to a lower exterior end thereof, so as to discharge the gathered air to the lower exterior end of the shaft.

10. The air cleaning apparatus as claimed in claim 9, wherein the lower air guiding mechanism includes a flange formed in a lower end of the circumference of the rotor, and bosses formed on a lower surface of the flange, in order to gather the air inwardly.

11. The air cleaning apparatus as claimed in claim 9, wherein the air discharging portion includes an inner diameter portion, placed between upper and lower bearings for supporting the rotating shaft, and an outlet port operable to downwardly pass the gathered air through the rotating shaft.

12. The air cleaning apparatus as claimed in claim 9, wherein the air discharging portion includes an inner diameter portion, placed between upper and lower bearings, for supporting the rotating shaft, and a plurality of through ports vertically extending from an upper center of the rotor.

13. The air cleaning apparatus as claimed in claim 9, wherein the air discharging portion includes an inner diameter portion, placed between upper and lower bearings, for supporting the rotating shaft, and an outlet port perforated on a bottom of a housing to which the stator is fixed.

14. An air cleaning apparatus for use in a hard disk drive including a spindle motor having a stator, a rotor and a rotating shaft, a plurality of disks adapted to be mounted on a circumference of the rotor of the spindle motor, the air cleaning apparatus comprising:

an upper air guiding mechanism, provided on an upper side of the rotor, for gathering air to a center of the rotor when the rotor rotates;

a lower air guiding mechanism, provided on a lower side of the rotor, for gathering air to a center of the rotor when the rotor rotates, and an air discharging portion extending from a periphery of the rotating shaft to a lower exterior end thereof, so as to discharge the gathered air to the lower exterior end of the shaft.

15. The air cleaning apparatus as claimed in claim 14, wherein the upper air guiding mechanism includes an impeller, provided between the rotor and an upper casing positioned above the rotor in coaxial relation with the rotating shaft, for guiding the air to the center of the rotor upon rotation of the rotor.

16. The air cleaning apparatus as claimed in claim 15, wherein the impeller of the upper air guiding portion is fixed to a lower surface of the upper casing of the rotor in coaxial relation with the rotating shaft.

17. The air cleaning apparatus as claimed in claim 14, wherein the upper air guiding mechanism includes spiral-shaped recesses formed on an upper surface of the rotor.

18. The air cleaning apparatus as claimed in claim 14, wherein the upper air guiding mechanism includes spiral-shaped recesses formed on an upper surface of a disk clamp which engages with the disks on an upper side of the rotor.

19. The air cleaning apparatus as claimed in claim 14, wherein the lower air guiding mechanism includes a flange formed in a lower end of the circumference of the rotor, and bosses formed on a lower surface of the flange, in order to gather the air inwardly.

20. The air cleaning apparatus as claimed in claim 14, wherein the air discharging portion includes an inner diameter portion, placed between upper and lower bearings for supporting the rotating shaft, and an outlet port that passes the gathered air through the rotating shaft.

21. The air cleaning apparatus as claimed in claim 14, wherein the air discharging portion includes an inner diameter portion, placed between upper and lower bearings, for supporting the rotating shaft and a number of through ports vertically extending from an upper center of the rotor.

22. The air cleaning apparatus as claimed in claim 14, wherein the air discharging portion includes an inner diameter portion, placed between upper and lower bearings for supporting the rotating shaft, and an outlet port perforated on a bottom of the housing to which the stator is fixed.

23. A method for cleaning air in an air cleaning apparatus for use in a hard disk drive including a spindle motor having a stator, a rotor and a rotating shaft, a plurality of disks mounted on a circumference of the rotor of the spindle motor, by means of the rotatable rotor of the spindle motor and upper and lower air guiding mechanisms, respectively, provided on upper and lower sides of the rotor, comprising the steps of gathering air around the rotor towards a center of the rotor when the rotor rotates, and discharging the gathered air, to a lower exterior end of the shaft, through an air discharging portion, thereby continuously cleaning a space around the disks.

24. The method as claimed in claim 23, wherein the discharging atmosphere of the air gathered by the air guiding mechanism through the air discharging portion satisfies the requirements of P1>P2>P3, wherein the atmosphere in an upper center of the rotor formed by the air guiding mechanism is P1, the atmosphere in an inner diameter portion of the housing at the air discharging portion is P2, and the atmosphere in outer side of the air discharging portion is P3.

25. The method as claimed in claim 24, wherein the number of impellers of the upper air guiding mechanism increases to raise the atmosphere P.

26. An air cleaning apparatus for use in a hard disk drive including a spindle motor having a stator, a rotor and a shaft, a plurality of disks adapted to be mounted on a circumference of the rotor of the spindle motor, the air cleaning apparatus comprising:

an upper air guiding mechanism, provided on an upper side of the rotor, for gathering air to a center of the rotor when the rotor rotates; and an air discharging portion extending from the periphery of the shaft to a lower exterior end of the shaft, so as to discharge the gathered air to the lower exterior end of the shaft.

27. An air cleaning apparatus for use in a hard disk drive including a spindle motor having a stator, a rotor and a shaft, a plurality of disks adapted to be mounted on a circumference of the rotor, the air cleaning apparatus comprising:

a lower air guiding mechanism, provided on a lower side of the rotor, for gathering air to a center of the rotor when the rotor rotates; and an air discharging portion extending from the periphery of the shaft to a lower exterior end thereof, so as to discharge the gathered air to the lower exterior end of the shaft.

28. An air cleaning apparatus for use in a hard disk drive including a spindle motor having a stator, a rotor and a shaft, a plurality of disks adapted to be mounted on a circumference of the rotor of the spindle motor, the air cleaning apparatus comprising:

an upper air guiding mechanism, provided on an upper side of the rotor, for gathering air to a center of the rotor when the rotor rotates;

a lower air guiding mechanism, provided on a lower side of the rotor, for gathering air to a center of the rotor when the rotor rotates, and an air discharging portion extending from a periphery of the shaft to a lower exterior end thereof, so as to discharge the gathered air to the lower exterior end of the shaft.

* * * * *